July 8, 1958  G. A. LYON  2,842,405
WHEEL COVER
Filed Sept. 20, 1955
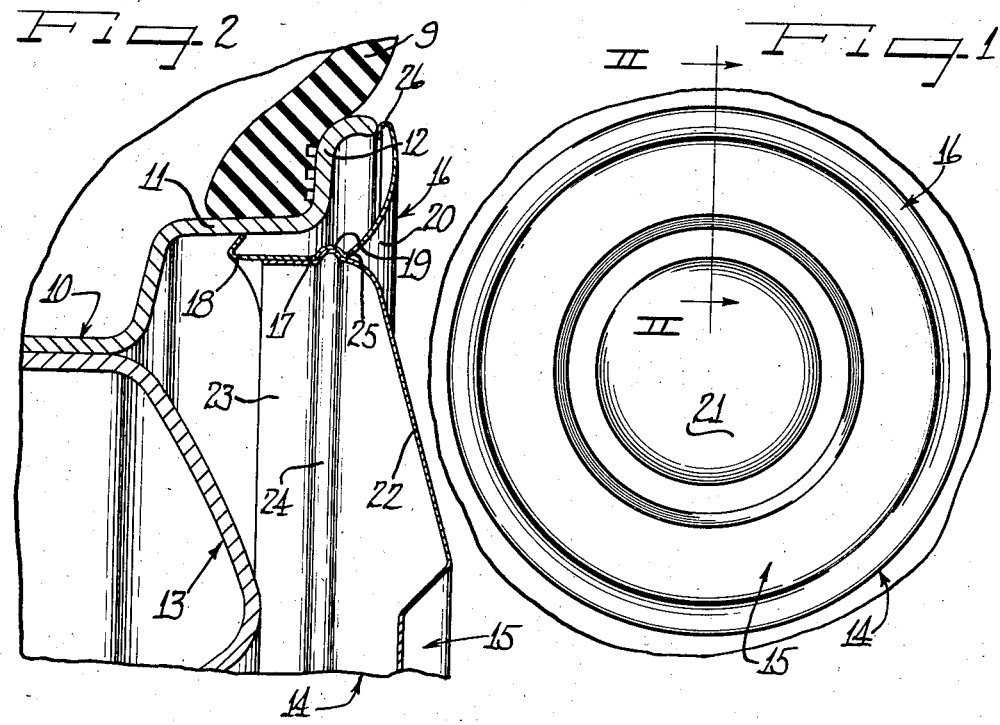
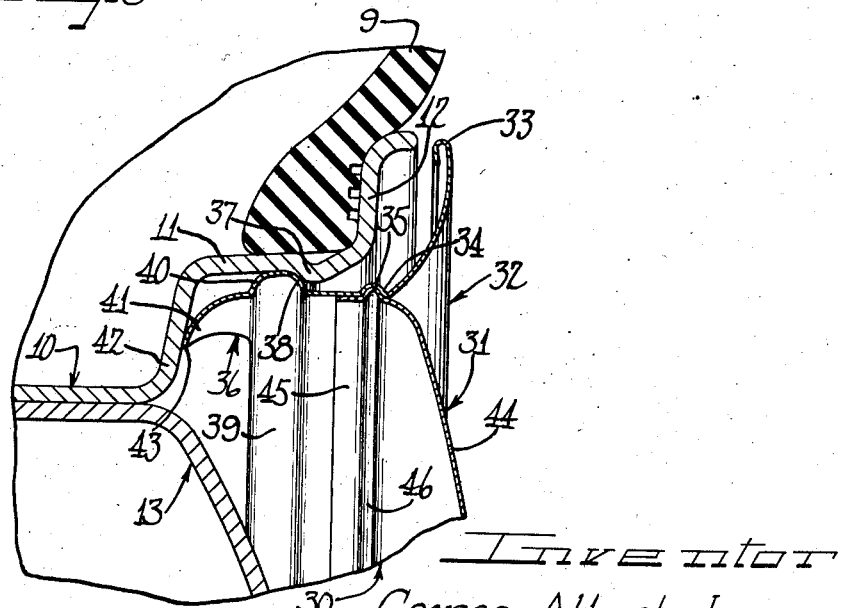
Inventor
George Albert Lyon

United States Patent Office 2,842,405
Patented July 8, 1958

2,842,405

WHEEL COVER

George Albert Lyon, Detroit, Mich.

Application September 20, 1955, Serial No. 535,336

8 Claims. (Cl. 301—37)

This invention relates generally to wheel structures and more particularly to a novel multi-part ornamental wheel cover.

In the automobile industry there is presently a demand for wheel covers which can be made of different metallic compounds for obtaining contrasting color effects. In the instant multi-part cover construction, it will be noted that retaining means is formed as an integral extension from one of the cover members with the other cover member being formed independently. It is contemplated that the cover member having provided thereon retaining elements should be made of sheet steel so as to provide resiliency in the retaining elements. The other cover member may be made from other metals, such as aluminum, which lends itself to color effects that are not always obtainable in an all steel cover. For illustration, by using an anodizing process aluminum can be given a great variety of lustrous colors, such, for illustration, as gold. It will also be appreciated that the other cover member when it is made from aluminum and other metals other than relatively expensive stainless steel may result in a reduced overall cost in the production of the cover.

Accordingly, an object of this invention is to provide a multi-part cover assembly wherein the part of the cover having retaining means can be made of steel, such as stainless steel, and the other cover member can be made of a different metal, such as aluminum, and interlocked in a simple manner to the other cover member.

Yet another object of this invention is to provide a multi-part metallic wheel cover which lends itself to economical manufacture on a large production basis.

A further object of this invention is to provide a multi-part cover construction which produces a highly ornamental contrasting color effect.

In accordance with the general features of this invention, there is provided in a wheel structure including multi-flanged rim and body parts, a wheel cover including an inner circular cover member and an outer annular cover member, the cover having cover retaining means on the underside of the cover cooperable with a wheel part to retain the cover upon the wheel, one of the members having a generally axially rearwardly turned annular flange, the other of the members also having an axially rearwardly turned flange, and one of the axial flanges having an annular seat and the other having an annular extension nested in the seat to interlock the inner and outer cover members together, one of the cover members being made from steel and the other of a metal that lends itself to use in an anodizing process thereby enabling strikingly contrasted color effects between the cover members.

Other features of the invention relate to the selective provision of an annular extension and an annular seat in confronting flanges of the inner and outer members.

Other objects and features of this invention may more fully appear from the following detailed description taken in conjunction with the accompanying drawing which illustrates several embodiments thereof and in which:

Figure 1 is a fragmentary side view of a wheel structure embodying the features of this invention;

Figure 2 is an enlarged fragmentary cross sectional view taken on substantially the line II—II of Figure 1 looking in the direction indicated by the arrow; and Figure 3 is a fragmentary sectional view similar to Figure 2 illustrating the second form of the invention.

As shown on the drawing:

The reference character 9 designates generally a pneumatic tire of either a tube or tubeless type and which is inflatable by a valve stem (not shown). The tire 9 is mounted in the customary way upon a multi-flange drop-center type of tire rim 10 including an outer inclined axial flange and a curled terminal flange 12. The rim 10 is supported in the customary manner upon a central body or spider member 13 detachably secured in a conventional manner at the center by wheel bolts (not shown).

Mountable upon the foregoing wheel is a multi-part sheet metal cover designated generally by the reference character 14 and which includes a central or inner cover member 15 and an outer cover member or ring 16. The outer cover member or ring 16 has a generally axially extending flange 17 terminating in spaced, angled, resilient cover retaining fingers 18 which may be constructed in accordance with the teachings of my issued Patent 2,624,634 granted January 6, 1953. The fingers 18 are of the return bent type having a short stiff wheel engaging terminal cooperating with the intermediate rim flange 11. In accordance with the teachings of my patent, it will be appreciated that these fingers must be resilient in order to have proper engagement with the axial rim flange 11. With this end in mind, I preferably make the outer cover member of sheet steel, for example, stainless steel, which lends itself to a highly polished finish.

As is best seen in Figure 2, it will be noted that an intermediate portion of the axial flange 17 is grooved at 19 providing a grooved area adjacent the outer portion 20 of the cover member 16. This groove 19 provides an annular seat for purposes which will hereinafter become apparent.

The inner cover member 15, since it does not in itself retainingly engage the wheel, may be made of other metallic material, such, for example, as aluminum which lends itself to a variety of lustrous finishes in color, such for illustration as gold. Any suitable aluminum anodizing process may be employed in this regard.

Inner cover member 15 is circular and includes a central crown (Figure 1) which merges with a generally radially outwardly and axially inwardly extending portion 22 and which is then turned axially under at the outer margin to form an annular generally axially extending flange 23. Provided upon the annular terminal axial flange 23 is an annular generally radially outwardly extending rib or extension or rib area 24 which is adapted to nestingly engage in assembly with outer cover member 16 in seat 19. Thus, it will be appreciated that by virtue of the fact that the flanges 17 and 23 are in confronting relationship, extension 24 of inner cover member 15 may be suitably interlocked in seat or groove 19 of cover member 16 to secure the members together. This results in the attainment of a reinforcing rib structure in close proximity to the retaining fingers 18 for backing up the fingers in their resilient camming engagement with inclined rim flange 11. The flanges 17 and 23 extend axially rearwardly toward the rim 10 in superimposed abutting relation with the flange 17 being radially spaced from the rim flange 11 and extended axially inwardly of the grooved area 19 and axially beyond the flange 23.

The advantages of employing the instant outer cover member or ring construction 16 are multi-fold since the ring 16 serves to extend the overall diameter of the cover 14, enables the cover to be provided with contrasting color effects, and in addition, serves to completely conceal the tire rim structure.

The cover members may be assembled together by centering outer cover member 16 with respect to inner cover member 15, and thereafter urging the two members together until extension or rib 24 is cammed over ring shoulder 25 into interlocking cooperation with the seat 19 on outer cover member 16.

Assembly of the cover on the wheel may be effected by first centering the wheel cover with the wheel and thereafter urging the retaining fingers 18 into tensioned retained engagement with the tire rim 10 or more particularly axial flange 11. Removal may be effected by inserting a suitable pry-off tool under the pry-off edge 26 of the ring 16 and thereafter prying the cover and more particularly the fingers 18 out of engagement with the axial rim flange 11.

Figure 3 illustrates a modified form of my invention and wherever possible identical elements have been indicated by the same numerals as in the first form of my invention.

In this form of my invention the cover 30 has an inner cover member 31 and an outer cover member or ring 32 which are maintained in unitary relation together in much the same manner as in the first embodiment and with the cover assembly being cooperable with the axial rim flange 11 in much the same manner as formerly.

Outer cover member 32 is of a curved convex cross section as was the case with cover member 16 in the first embodiment and includes a pry-off edge 33 at one end which is adapted to overlie the outer margin of the tire rim 10. The radially inner end of outer cover member 32 has an annular axial flange 34 provided with an annular seat 35. Connected to the axially inner end of axial flange 34 is retaining means 36 which is adapted to cooperate with circumferentially spaced protuberances or bumps 37 pressed out of axial flange 11. Retaining means 36 includes an annular shoulder 38 which is adapted to snap behind the bumps when the outer cover member is mounted upon the wheel. It will be noted that the retaining means 36 has a relatively enlarged annular rib 39 and is provided with a lead-in camming shoulder 40 which is adapted to be progressively flexed radially inwardly as the rib 39 is urged over bumps 37. Integral with and provided at the axially inner margin of the rib 39 are a plurality of circumferentially spaced axially rearwardly extending stops 41 which are adapted to engage radial rim flange 42 to limit the axial inward displacement of the cover.

Each of the stops 41 comprises a generally radially and axially inwardly extending arcuate curving member terminating in a rim engaging terminal edge 43. This arcuate member or stop 41 acts in the same manner as a spring in that when axial impact forces are applied to the cover there is a certain amount of flexure in the member 41 thereby allowing the cover to absorb the shock without permanently damaging or displacing the cover from its normal position.

Inner cover member 31 includes a generally axially inwardly and radially outwardly extending portion 44 terminating in an underturned axial flange 45 having provided thereon an annular generally radially outwardly extending rib or extension 46. This rib 46 is adapted to interlock in assembly with outer cover member 32 in the same manner as in the first form of my invention. Additionally, retaining means 36 is backed up by axial flange 45 in much the same manner as previously set out in connection with the first embodiment.

The cover of the modified form and more specifically outer cover member 32 may be preferably formed from stainless steel with the inner cover member being formed of some other material, such as aluminum which lends itself to special processing to obtain contrasting color effects when viewed together with outer cover member 32.

Assembly and removal upon the cover may be effected in much the same manner as in the first form of the invention. That is, retaining means 36 upon the application of an axial force may be urged into retaining engagement behind bumps 37.

It will be understood that modifications and variations may be effected without departing from the scope of the novel concepts of the present invention.

I claim as my invention:

1. In a wheel structure including multi-flanged rim and body parts, a wheel cover including an inner circular cover member and an outer annular cover member, one of said cover members having a generally axially rearwardly turned annular flange, the other of said members also having an axially rearwardly turned flange, said flange on said outer cover member extending axially beyond the other of said flanges and provided with circumferentially spaced resiliently deflectable fingers for retaining the cover upon the wheel, one of said axial flanges having an annular seat and the other having an annular extension nested in said seat to interlock the inner and outer cover members together in assembly, said extension being located on one of said axial flanges extending from the annular underturned periphery of one cover member and said seat being formed in the other of said axial flanges extending from an annular underturned periphery of the other cover member and transversely enveloping the annular extension of the other cover member in snap-on, pry-off engagement thereby providing a reinforced area adjacent and relative to which the retaining fingers can resiliently flex so as to be backed up thereby.

2. In a wheel structure, a wheel including multi-flanged rim and body parts and having a cover engaging surface, a wheel cover assembly including an inner circular cover member and an outer annular cover member, one of said cover members having a generally axially rearwardly turned annular flange, the other of said members also having an axially rearwardly turned flange, said flanges when said cover members are in assembly extending axially rearwardly in superimposed abutting interlocked relation, said flange in closest proximity to said cover engaging surface having at least one self-retaining resiliently deflectable extension extending generally axially rearwardly and radially therefrom into detachable retaining cooperation with said cover engaging surface to maintain said wheel cover assembly in self-retained detachable engagement upon the wheel, and one of said axial flanges having an annular grooved portion and the other having an annular rib nested in said grooved portion to interlock the inner and outer cover members together in snap-on, pry-off detachable assembly with the retaining engagement between said cover members being augmented upon the engagement of said extension with the wheel and with the rib and grooved portion providing a reinforcing rib area closely adjacent said extension augmenting the resiliency thereof and relative to which said extension can resiliently flex so as to be backed up thereby.

3. The cover assembly of claim 2 characterized by the cover member having said self-retaining resilient extension being comprised of spring steel and the other of said cover materials being comprised of a material having an external surface that has a strikingly contrasted color relative to the steel cover member.

4. In a wheel structure, a vehicle wheel including multi-flanged tire rim and body parts and having a tire rim surface, a wheel cover assembly for self retaining itself upon the vehicle wheel including an inner circular cover member and an outer annular cover member, said cover members each having an axially rearwardly turned annular flange with one of the flanges extending axially beyond the other of said flanges and provided with at least one resiliently deflectable cover retaining extension cooperable with said tire rim surface in detachable self retained assembly on the wheel, said flanges when said cover members are in assembly extending axially rearwardly in superimposed abutting relation with one of said flanges having a grooved portion and the other of said flanges having a rib nested in said grooved portion interlocking the cover members in unitary assembly and providing a reinforcing rib area closely adjacent said resiliently deflectable self retaining extension augmenting the resiliency thereof and relative to which said extension can resiliently flex so as to be backed up thereby, said axially rearwardly turned flange on said outer cover member extending axially beyond the axially rearwardly turned flange on the inner cover member.

5. The wheel structure of claim 4 further characterized by the axially rearwardly extending flange on the inner cover member extending axially inwardly of the grooved portion and being disposed in radially underlying abutting engagement with the axially rearwardly extending flange on the outer cover member.

6. In a wheel structure, a vehicle wheel including multi-flanged tire rim and body parts and having a tire rim surface, a wheel cover assembly for self retaining itself upon the vehicle wheel including an inner circular cover member and an outer annular cover member, said cover members each having an axially rearwardly turned annular flange with one of the flanges extending axially beyond the other of said flanges and provided with at least one resiliently deflectable cover retaining extension cooperable with said tire rim surface in detachable self retained assembly on the wheel, said flanges when said cover members are in assembly extending axially rearwardly in superimposed abutting relation with one of said flanges having a grooved portion and the other of said flanges having a rib nested in said grooved portion interlocking the cover members in unitary assembly and providing a reinforcing rib area closely adjacent said resiliently deflectable self retaining extension augmenting the resiliency thereof and relative to which said extension can resiliently flex so as to be backed up thereby, said axially rearwardly extending flange on said inner cover member extending axially inwardly of the grooved portion and being disposed in radially underlying abutting engagement with the axially rearwardly extending flange on the outer cover member.

7. In a wheel structure, a vehicle wheel including multi-flanged tire rim and body parts and having a tire rim surface, a wheel cover assembly for self retaining itself upon the vehicle wheel including an inner circular cover member and an outer annular cover member, said cover members each having an axially rearwardly turned annular flange with one of the flanges extending axially beyond the other of said flanges and provided with at least one resiliently deflectable cover retaining extension cooperable with said tire rim surface in detachable self retained assembly on the wheel, said flanges when said cover members are in assembly extending axially rearwardly in superimposed abutting relation with one of said flanges having a grooved portion and the other of said flanges having a rib nested in said grooved portion interlocking the cover members in unitary assembly and providing a reinforcing rib area closely adjacent said resiliently deflectable self retaining extension augmenting the resiliency thereof and relative to which said extension can resiliently flex so as to be backed up thereby, said axially rearwardly extending flange on said inner cover member extending axially inwardly of the grooved portion and being disposed in radially underlying abutting engagement with the axially rearwardly extending flange on the outer cover member, said tire rim surface comprising an intermediate rim flange, said retaining extension including an intermediate rim gripping area disposed radially outwardly of the axially rearwardly turned flanges and axially inwardly of the axially rearwardly turned flange on the inner cover member.

8. The wheel structure of claim 7 further characterized by said outer cover member being bottomed at its outer marginal area against the tire rim and said retaining extension including a short stiff generally radially and axially outwardly extending wheel engaging portion with said intermediate rim gripping area disposed at the outer end of the short stiff portion.

References Cited in the file of this patent

UNITED STATES PATENTS

| 2,368,243 | Lyon | Jan. 30, 1945 |
| 2,368,251 | Lyon | Jan. 30, 1945 |
| 2,433,854 | Lyon | Jan. 6, 1948 |
| 2,443,626 | Lyon | June 22, 1948 |
| 2,581,424 | Lyon | Jan. 8, 1952 |
| 2,624,634 | Lyon | Jan. 6, 1953 |